United States Patent [19]

Graham, Jr. et al.

[11] Patent Number: 4,527,244
[45] Date of Patent: Jul. 2, 1985

[54] ELECTRO-HYDRAULIC POSITION CONTROL FOR A MACHINE TOOL WITH ACTUAL AND COMMANDED POSITION FEEDBACK

[76] Inventors: Merrill E. Graham, Jr., P.O. box 545, Tehachapi, Calif. 93561; Ronnie L. Blankenship, 43215 43rd St. West, Quartz Hill, Calif. 93534

[21] Appl. No.: 370,205

[22] Filed: Apr. 21, 1982

[51] Int. Cl.$^3$ ............................................. G05B 13/00
[52] U.S. Cl. .................................. 364/474; 364/475; 408/63; 408/130; 409/100
[58] Field of Search ............... 364/474, 475; 408/130, 408/63; 409/100; 82/21 A; 318/567, 569, 563, 565, 635; 91/37

[56] References Cited

U.S. PATENT DOCUMENTS

| | | | |
|---|---|---|---|
| 2,625,844 | 1/1953 | Beckett et al. | 408/130 X |
| 2,986,957 | 6/1961 | Klancnik | 408/130 |
| 3,401,583 | 9/1968 | Jacobson et al. | 408/130 |
| 3,559,510 | 2/1971 | Blackburn | 408/63 |
| 3,854,352 | 12/1974 | Fortune | 82/21 A |
| 3,970,830 | 7/1976 | White et al. | 364/474 X |
| 3,996,454 | 12/1976 | Froyd | 318/565 |
| 4,074,350 | 2/1978 | Roch et al. | 364/474 X |
| 4,120,583 | 10/1978 | Hyatt | 364/474 X |
| 4,131,837 | 12/1978 | Whetham | 364/474 X |
| 4,135,239 | 1/1979 | Hamill, III et al. | 364/474 X |
| 4,220,995 | 9/1980 | Shoda | 364/474 X |
| 4,321,679 | 3/1982 | Fujie et al. | 364/478 X |
| 4,338,659 | 7/1982 | Kurakake | 364/474 X |
| 4,372,183 | 2/1983 | Lehtinen | 364/191 X |

OTHER PUBLICATIONS

Systems International, "Position Control"; Andrew Sills; Oct. 1981, pp. 51 and 52.

*Primary Examiner*—Jerry Smith
*Assistant Examiner*—Allen MacDonald
*Attorney, Agent, or Firm*—Spensley Horn Jubas & Lubitz

[57] ABSTRACT

An automated control system and method for control of hydraulically positionable machine tools is disclosed. A servo motor is coupled to a servo valve spool such that the angular displacement of the motor shaft directly corresponds to the resultant rotation of the spool, which in turn threadably engages a precision lead screw fixed to a tool slide. In the preferred embodiment, a position encoder provides signals indicative of the angular displacement of the motor shaft. The position encoder signals are fed back to an electronic central processor which controls motor operation. The controller is programmed with the lead screw pitch information, and a series of instructions to advance or reverse the spool along the lead screw in a series of movements precisely corresponding to the desired movements of the slide.

11 Claims, 11 Drawing Figures

ELECTRO-HYDRAULIC POSITION CONTROL FOR A MACHINE TOOL WITH ACTUAL AND COMMANDED POSITION FEEDBACK

FIELD OF THE INVENTION

The field of this invention is apparatus for controlling machine tools, and more particularly, automated control systems for hydraulically operated machine tools.

BACKGROUND OF THE INVENTION

This invention relates to automated control systems for controlling the operation of heavy machine tools such as mills, presses and the like, used to machine a workpiece such as metal stock into predetermined forms. In many applications, it is essential for these operations to be performed in accordance with very close tolerances. This requires some means of moving and positioning very accurately the machine tool implement, i.e., a spindle carrying a mill, cutter, drill or other tool implement. For many years, a manual system was employed wherein the operator manipulated a hand crank, which in turn actuated a hydraulic valve to control the hydraulic pressure to the hydraulic ram which in turn caused the machine tool carriage to move along a way. In a typical example, the machine tool is provided with three hand cranks, each corresponding to a degree of movement of the implement, allowing the operator to move the machine tool implement along an X, Y and Z direction. A typical example of a prior art machine is the Cincinnati 28" series vertical "Hydro-Tel" (Trademark) milling machine, manufactured by the Cincinnati Milling Machine Company, Cincinnati, Ohio.

While hydraulic positioning systems have the advantage of providing great power with relatively simple mechanisms, an operator of considerable skill is required to operate these types of machines under close tolerance work, and the time required to machine workpieces to very close tolerances dramatically increases.

To some degree, these problems are obviated by the use of a "tracer" system wherein a stylus is provided and connected to separate hydraulic valves so that simply by running a stylus along the edge of a pattern, the tool implement automatically follows the stylus' motion to reproduce the pattern. Nevertheless, this system is also subject to considerable drawbacks. To prevent gouges and marking of the workpiece, the speed at which the implement is moved should be substantially constant and as slow as possible. It requires an operator of very considerable skill to run a stylus along a pattern at a constant, slow speed to minimize gouging, scarring or marking of the workpiece, and even with a skilled operator, some marking of the workpiece is virtually inevitable. Once again, it is very difficult to reproduce the pattern within very close tolerances by the use of such a tracer system.

The technical disadvantages of the manual hydraulic control system have been largely overcome by the advent of numerically controlled or computer controlled machine tools. With such systems, as presently understood by applicants, the hydraulic mechanism is replaced with an electrical mechanism. The hydraulic ram associated with each axis of movement is replaced with a large ball screw rotated by a large electric motor precisely operated by the computer controller. Thus, the computer may be programmed in an appropriate manner to move the implement through a desired movement or plurality of movements by causing the electric motor to drive the ball screw through angular displacements at a specified speed. In such an embodiment, the computer accurately senses the angular displacement of the motor shaft and thereby very accurately determines or assumes the position of the tool implement.

Such an automated electrical system suffers the disadvantage that the electric motors and the ball screw must be of relatively large size to move the heavy machine tool carriages, and accordingly are quite expensive. Typically, it is known that a manually controlled machine such as the Cincinnati "Hydrotel" milling machine is retrofitted by the manufacturer at its factory by removing the hydraulic mechanisms and retrofitting the electric motor, ball screw, computer and associated equipment. Applicants understand that this retrofit necessitates a six-month downtime while the machine tool is shipped to the factory from its installation site, refurbished, retrofitted with the electric control system and then shipped back to its installation site. The cost is very substantial.

There are thousands of machine tools in use today which have hydraulic manual controls. A tremendous need exists for a means to fit these existing machines with automated control systems at an economical price, with a reasonable installation time, and without transporting the tool from its work site.

It is, accordingly, one object of the present invention to allow on-site retrofitting of machine tools having manual controls with automated controls at a relatively low cost and with a minimized installation time.

Another object of the present invention is to provide a mechanism for controlling a hydraulically operable machine tool to close tolerances.

It is another object of the present invention to provide an automated control system for hydraulically operable machine tools capable of machining parts to very close tolerances.

Another object of the present invention is to provide an automated control capability but to retain the capability of manual tracer operation in the event of computer failure, or for use on small production runs.

Other objects will be apparent from the following description.

SUMMARY OF THE INVENTION

The present invention comprises a system for automated control of hydraulic machine tools. The system comprises a central computer controller, at least one hydraulic valve for controlling hydraulic pressure applied to a hydraulic ram connected to the traveling carriage of the machine tool, electric motor means for driving the hydraulic valve in response to commands from the controller, and position encoder means for sensing the angular displacement of the motor means. An error detection circuit is provided to detect abnormal system conditions and disable the operation of the machine tool when such condition is confirmed.

The system is particularly well adapted to installation on pre-existing machine tools with manual hydraulic control systems. In a typical embodiment of such a manually controlled tool, a hydraulic servo valve is mounted on a lead screw fixed to the moving carriage, and operates with closed loop feedback. Rotation of the servo spool opens the valve and applies hydraulic pressure to the double action ram in a direction dependent upon the direction of rotation of the spool. The carriage in turn is moved by the hydraulic ram, causing the lead screw to carry the servo spool in a direction opposite to the direction of the initial movement, thereby causing the servo valve to close. Since the travel of the tool carriage corresponds directly to the travel of the lead screw, the rotation of the spool is directly related to the carriage travel, i.e., by determining the angular displacement of the spool and the number of threads per inch of the precision lead screw.

In the preferred embodiment, a servo motor is coupled to the servo valve and is adapted to turn the servo spool precisely through a predetermined displacement to move the tool carriage a predetermined distance. The controller may typically be programmed with a plurality of tool implement moves to machine the workpiece in a desired manner.

The present invention allows the transformation of a manually-controlled machine tool into a computer-controlled machine tool, at a fraction of the cost of prior art conversions. Since the axial displacement of the servo spool is precisely related to the corresponding movement of the tool carriage, the use of a computer-controlled servo actuator capable of precise movements results in correspondingly precise tool movements.

Another aspect of the invention is the error detection circuit which detects conditions in which the valve drive and tool carriage are not moving in coordination, disabling the tool if such a condition is detected. This circuit minimizes possible damage to the tool or workpiece caused by a valve seizure or other malfunction.

Other features and improvements are disclosed.

DETAILED DESCRIPTION OF THE PREFERRED EMBODIMENT

The present invention comprises a novel automated control system for hydraulically positionable machine tools and the like. The following description of the preferred embodiment is provided to enable any person skilled in the machine tool art to make and use the present invention, and sets forth the best mode contemplated by the inventors of carrying out their invention. Various modifications, however, to the preferred embodiment, will be readily apparent to those skilled in the art, and the generic principles defined herein may be applied to other embodiments. Thus, the present invention is not intended to be limited to the embodiment shown, but is to be accorded the widest scope consistent with the principles and novel features disclosed herein.

While automated machine tools are not new per se, applicants are aware of no automated system in commercial use which utilizes the hydraulic control apparatus. The present invention allows the ready adaptation of commercially available computerized controllers, and electric motor drive systems, heretofore used for direct movement of small tool carriages, to the hydraulic control systems. The surprising result of this adaptation is the precise control achieved over the tool movement itself, with an elegantly simple modification to the prior art hydraulic control system.

Figure 1:
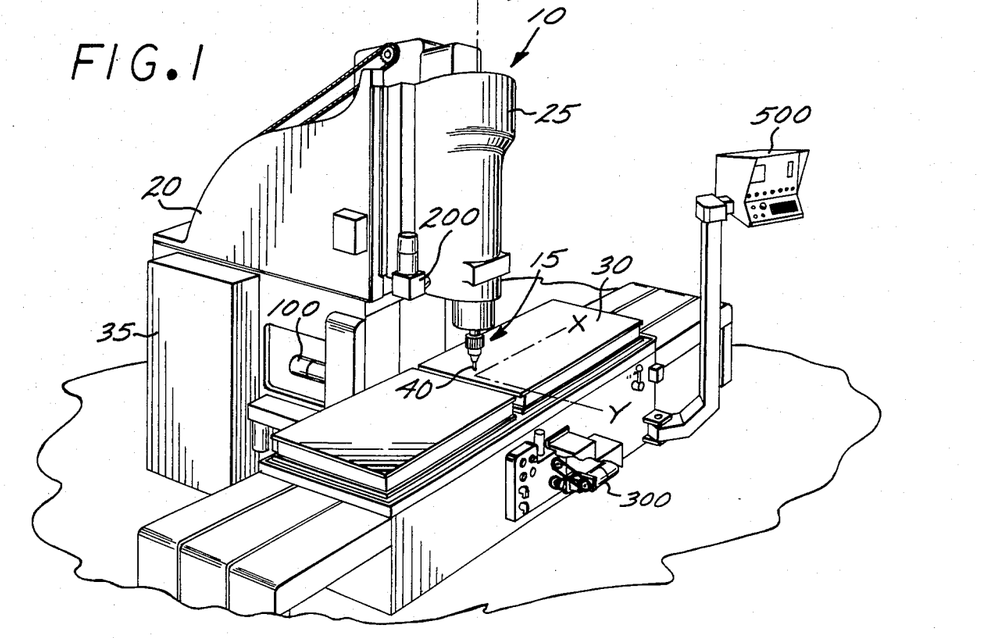
FIG. 1 is a perspective view of a machine tool with the preferred embodiment of the automated control system of the preferred embodiment of the present invention.

Referring now to FIG. 1, a perspective view of an exemplary machine tool, a Cincinatti 28" "Hydro-Tel" (Trademark) milling machine is depicted, with the preferred embodiment of the invented automated control system fitted thereto. The machine tool 10 has one spindle 15 mounted on a carriage 25. The vertical or Z axis position of spindle 15 may be adjusted by a movement of carriage 25 along the Z axis. Thus, carriage 25 slides along a way and is positioned by the action of a hydraulic ram.

Carriage 25 is in turn mounted on a movable second carriage 20 which is positionable by a second hydraulic ram along the Y axis. In a similar fashion, table 30 is mounted on a way structure and is movable along the X axis by a third hydraulic ram. Also shown in FIG. 1 are motors 100, 200 and 300, which respectively relate to drive control mechanisms in the Y, Z and X axes directions. Electronic computer 500 is disposed in a convenient location for the operator to provide manual inputs into the computer. The computer 500 is coupled to the motors via wiring harnesses and conventional motor drive circuits (not shown).

The machine tool 10 illustrated in FIG. 1 is conventionally controlled by the operator turning manual cranks (not shown) which in turn rotate hydraulic servo valves, more fully described hereinbelow, to control the flow of hydraulic pressure to the respective hydraulic rams. In accordance with the present invention, the manual crank mechanisms have been replaced by motor driven apparatus including motors 100, 200 and 300. Spindle 15 carries the tool implement used to machine a workpiece affixed to table 30. Hence, by appropriate control of the X, Y and Z hydraulic rams, the workpiece may be machined by the implement driven by spindle 15.

While a particular machine tool 10 is depicted and described in general detail herein, the control system of the present invention is adaptable for use on virtually any type of hydraulically operated machine tool. Moreover, multiple spindle machines (e.g., multiple spindle machines manufactured by H. H. Wilson, Inc.) may be controlled by apparatus arranged in accordance with the invention. Hence, the scope of the invention shall not be limited to the one-spindle milling machine generally depicted in FIG. 1.

Figure 2:
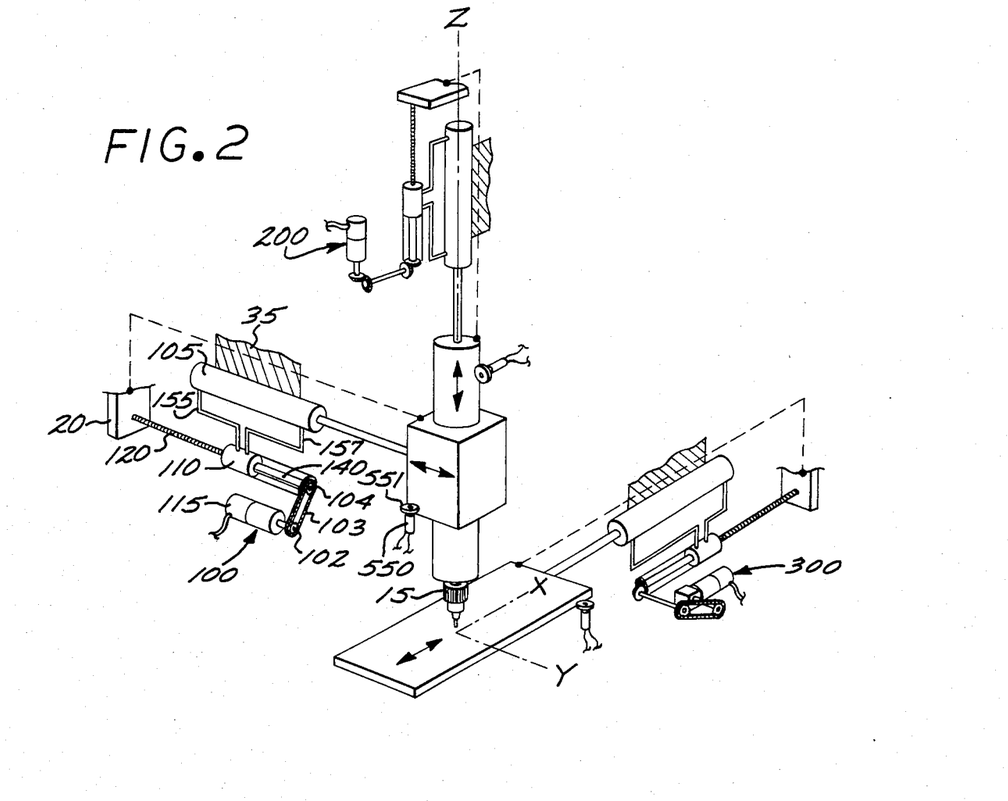
FIG. 2 is a diagrammatic perspective view illustrating the control apparatus for each of the three axes of movement of the preferred embodiment.

Referring now to FIG. 2, a perspective view diagrammatically illustrating the control mechanism of the present invention is illustrated. Each of the control mechanisms for the X, Y and Z axes are generally equivalent, and hence the Y axis control mechanism only will be described in detail. It should be understood that the description of the hydraulic system is intended only to generally describe its operation, and that the actual servo valves, rams and piping may be considerably more complex than the simplified, illustrative drawings referred to herein.

Double action hydraulic ram 105 is affixed to bed 35 of the tool 10, with its ram cylinder being affixed to carriage 20. Hydraulic lines 155 and 157 are passed between hydraulic valve 110 and ram 105 to supply hydraulic pressure to operate the ram. Hydraulic servo valve 110, which regulates the flow of hydraulic fluid to the ram 105, is disposed concentrically around lead screw 120, one end of which is affixed to carriage 20.

The above elements of the hydraulic system are unchanged from the prior art manual mechanisms utilized in machine tool 10. Before the automated control system of the preferred embodiment, however, servo valve 110 was operatively coupled to a hand crank turned by the operator, which causes the servo valve 110 to traverse the lead screw 120. In the preferred embodiment of the invention, however, the hand crank is replaced by electric motor 100 coupled through sprockets 102 and 104 and chain 103 to element 140 to operate servo valve 110.

Similar arrangements are depicted in FIG. 2 for the Z axis and X axis control mechanisms, although the Z and X axes are driven by the motor through beveled gear and shaft arrangements.

Figures 3, 4, 5:
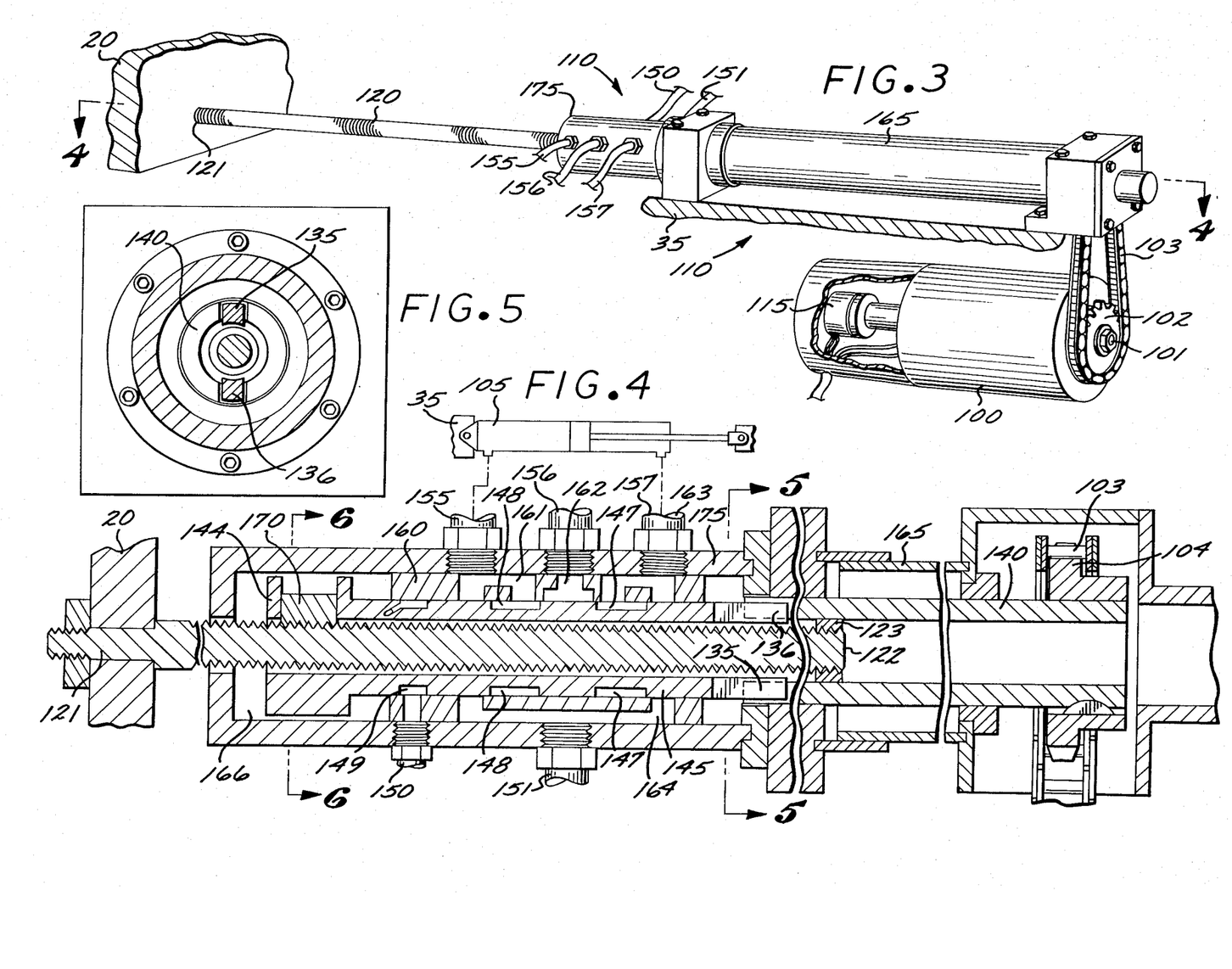
FIG. 3 is a perspective diagrammatic view illustrating the control mechanism for the Y axis of the preferred embodiment illustrated in FIG. 1.
FIG. 4 is a section view taken along line 4—4 of FIG. 3, illustrating a simplified cross-sectional view of the servo valve in cutaway view, and diagrammatically illustrating the hydraulic connections to the ram.
FIG. 5 is a section view illustrating the connection between the servo spool and servo sleeve.

Referring now to FIG. 3, the Y axis control mechanism is depicted in isolation. Servo valve 110 is mounted to stationary bed 35 of machine tool 10. Precision lead screw 120 runs concentrically through servo valve 110 and has one end 121 affixed to slidable carriage 20 of machine tool 10; its other end 122 slides within servo valve 110 on bushing 123. (See FIG. 4.) Lead screw 120 does not rotate.

Hydraulic lines 150, 151, 155, 156 and 157 run to the body 160 of valve 110. The shaft 101 of motor 100 has sprocket 102 affixed thereon. Chain 103 is reaved around sprocket 102 and around sprocket 104 disposed on sleeve 140 of servo valve 110 (see FIG. 4). As shown in breakaway view in FIG. 3, position encoder 115 is affixed to the opposite end of the shaft 101 of motor 100.

Referring now to FIG. 4, the operation of the servo valve as driven by motor 100 will be described. Servo valve 110 is the prior art unit employed with the manually operable machine tool 10. It is a servo valve adapted to employ closed loop feedback whereby reaction to the servo operation urges the servo valve to the null, closed position shown in FIG. 4. The feedback is mechanical in nature, i.e., opening the valve causes the ram to move the rack 20 in a direction which in turn causes motion of servo spool 145 in the opposite direction, thereby closing the valve. Hence, the valve operates around a null point, and the mechanical, closed loop feedback urges the valve back toward the null point.

Spool 145 is a hollow cylindrical member disposed within body 175 of servo valve 110. Precision lead screw 120 extends through the hollow opening in spool 145. Spool 145 is also formed with a plurality of concentric relieved areas 146, 147 and 148 formed in its outer surface. Spool 145 is in turn slidably fitted within hollow cylindrical bushing 160. Bushing 160 is fixed within body 175 of valve 110, and is also formed with a plurality of relieved areas or ports 161, 162, 163, 164 and 166 which, when spool 145 is appropriately disposed, mate with corresponding relieved areas 146, 147 or 148 in the spool 145.

Hydraulic line 151 supplies the high pressure input from the hydraulic pump and communicates through an opening in body 175 to port 164. Line 156 depicts a return line to the hydraulic fluid reservoir from the ram, and communicates through a bore in body 175 with port 162 in bushing 160.

Hydraulic line 155 communicates through body 175 with port 161 of bushing 160. Hydraulic line 157 communicates through body 175 with port 163 in bushing 160. As depicted in FIG. 4, lines 155 and 157 are coupled respectively to ends of the hydraulic ram 105, a double acting hydraulic ram.

Pawls 135 and 136 extend from the end of spool 145 opposite end 143 of spool 145. Pawls 135 and 136 interlock with corresponding relieved openings in the end of sleeve 140. Spool nut 170 is affixed to end 144 of spool 145 and threadably engages precision lead screw 120. Nut 170 causes rotation of spool 145 to advance along lead screw 120. Since lead screw 120 is precisely ground with a thread pitch of four threads per inch, the advancement of spool 140 is very accurately a function of its angular displacement. (Lead screw 120 will typically have double threads for added strength, and nut 140 will be adapted to engage both sets of threads.) In order that there be no backlash introduced by the connection of pawls 135 and 136 with sleeve 140, it is necessary that there be a very tight sliding fit between the pawls and the relieved areas in sleeve 140.

Figure 6:
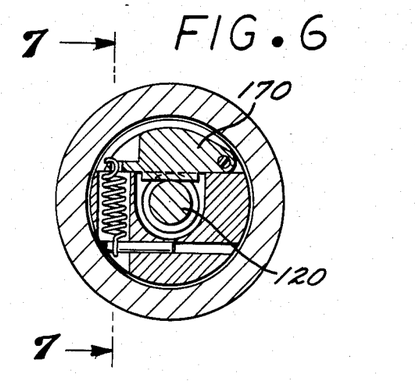
FIG. 6 is a cross-sectional view taken along line 6—6 in FIG. 4 illustrating the servo spool nut, which is driven by the movement of the servo spool.
Figure 7:
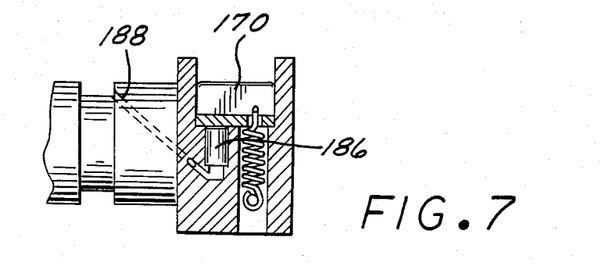
FIG. 7 is a partial side cross-sectional view taken along line 7—7 in FIG. 6 of the servo spool and servo nut.
Figure 8:
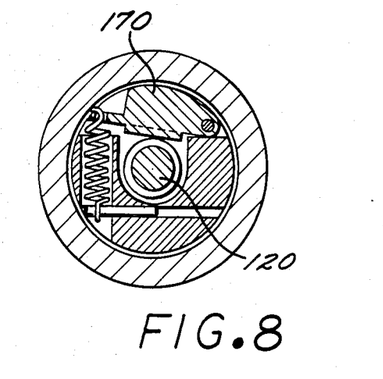
FIG. 8 is an end view of the servo nut.

Referring now to FIG. 5, a cross-sectional view taken along line 5—5 in FIG. 4 illustrates the interlocking of pawls 135 and 136 with relieved areas of sleeve 140. Sleeve 140 is constrained from movement in an axial direction along the axis of the lead screw 120, but may be rotated about its axis. Rotation of sleeve 140 causes rotation of spool 145, as a result of the engagement of pawls 135 and 136 into relieved openings in the end of sleeve 140. Rotation of the spool 140 causes the spool to advance along the axis of the lead screw due to engagement of spool nut 170 with threads of the lead screw. (See also FIGS. 6, 7 and 8.)

Movement of spool 145 in an axial direction, e.g., in a direction of end 122 of lead screw 120, causes circular relieved area 147 of spool 140 to overlap ports 163 and 164 of bushing 160. This alignment provides a path for hydraulic fluid to pass from inlet port 164 through relieved opening 147 into port 163 and thereby through hydraulic line 157 to the end of the ram. At the same time, port 161 of bushing 160 will overlap relieved area 148 of spool 140, which relieved opening will also communicate with port 162, thereby forming a path for fluid to return from the opposite end of the ram through line 155 into port 161, through relieved opening 148 into port 162, and through line 156 to the fluid reservoir.

This pressure applied to the ram is adapted to move carriage 20 in the opposite direction from which the spool was advanced, thereby tending to return servo valve 110 to its null position. Thus, as carriage 20 moves in the direction of end 122 of the lead screw, it carries lead screw 120 in the opposite direction. Thus, since spool 145 is slidable within bushing 160, spool 145 is carried back to its initial position, closing off the flow of hydraulic fluid. A similar operation occurs when spool 145 is rotated in the opposite direction by sleeve 140. Moreover, while the spool 145 tends to be threading away from, or toward, sleeve 140, it will not, in normal operation, advance to a stopped position against the end of sleeve 140, or advance out of its interlocked position, due to the closed loop, null operation of the servo valve 110.

The foregoing operation is set forth to aid in understanding the operation of the preferred embodiment of the present invention; it is a description of the prior art apparatus. Whereas the spindle of the manually operable machine tool 10 was actuated by the operator turning sleeve 140 through a hand crank, in the disclosed embodiment of the invention, the hand crank has been replaced by a computer-controlled motorized rotation system. Thus, as shown in FIG. 4, chain 103 is reaved about sprocket 104 affixed to sleeve 140. It may be seen that the carriage 20 will continue to move only so long as sleeve 140 continues to rotate spool 145, or, if sleeve 140 is not rotating, only until the closed loop feedback returns the spool to its null position.

Figure 10:
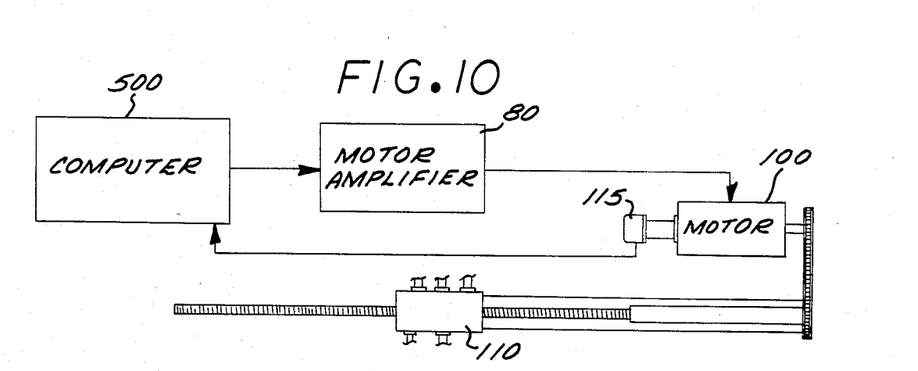
FIG. 10 is a block diagram of the elements of the Y axis control system of the preferred embodiment.

Referring now to FIG. 10, a simplified block diagram of the control system of the preferred embodiment is illustrated, showing only the Y axis control apparatus. Computer 500 controls the operation of motor 100 through motor drive amplifier 80, and receives information from position encoder 115 indicative of the angular displacement of the motor shaft. Since the angular displacement of the motor shaft 101 is directly translated into linear travel of carriage 20

$$\left(\text{travel} = \frac{\text{no. of motor shaft turns}}{4 \text{ turns/inch}}\right),$$

the computer readily and precisely controls the motion of carriage 20.

The motors 100, 200 and 300 used in the preferred embodiment are D.C. servo motors manufactured by Torque Systems, model number M133. The D.C. servo motors are readily available from other sources, e.g., Electro-Craft Corporation, 1600 2nd Street, Hopkins, Minn. 55343. The encoders 115 mounted on the shafts of these motors are manufactured by Renco Corporation, P.0. Box 246, Goleta, Calif. 93017, model number R2533-D-2500-F1-P18-S. These encoders are capable of resolving the angular displacement of motor shaft 101 to within 1/2500 of a shaft revolution. Such encoders are well-known measuring devices, and include a transparent circular disc mounted on an axis and having 2500 equally spaced radial lines thereon. An optical line reader detects passage of the opaque line, and generates a signal representative of the passage of the line.

Other types of position detection apparatus are well known in the art. Rotary and linear resolvers, as well as incremental linear transducers, may be interchanged for the particular encoder used in the preferred embodiment. (For example, incremental linear transducers are available from Heidenhain Corporation, 80 N. Scott Street, Elk Grove Village, Ill.) The position transducer may be mounted on the lead screw 120, or on the moving tool carriage 20.

The present invention contemplates that the position feedback to computer 500 may be from carriage 20 or lead screw 120, i.e., with overall closed or open loop feedback. However, there will typically be a lag time between operation of motor 100 and the hydraulic system reaction. This lag time may result in carriage movement oscillations at the null position, unless corrective measures are taken. With the position feedback being taken from the motor shaft, as in the preferred embodiment, the hydraulic system lag time is ignored, since the system is able to assume that electrical system action produces a corresponding hydraulic system reaction. Since the X, Y and Z axes drive system will all have a hydraulic lag time, the control system simply ignores this lag time, and the machinery operation will take place within the response time parameter of the hydraulic system.

Motor amplifier 80 provides the appropriate power to motor 100, under control of computer 500. Motor amplifiers are well known in the art, and are readily available from manufacturers such as West Amp, Incorporated, 1542 15th Street, Santa Monica, Calif. In the preferred embodiment, amplifier 80 is adapted to provide a maximum drive current of 10 amperes to motor 100.

In the preferred embodiment, a Centurion (trademark) Computer, Model No. C111 is used. This computer is sold by Industrial Information Control, 14627 Martin Drive, Eden Prairie, Minn. 55344, with software appropriately adapted to use in connection with the control of machine tools. Other computers are available from other manufacturers, e.g., the "Mark Century" (trademark) line of numerical control processors sold by the General Electric Company, Industrial Control Department, Charlottesville, Va. 22906. In fact, the computer 500, the motors 100, 200 and 300, decoders 115, 215 and 315 and motor drive generator 80, together with associated wiring harnesses, are commercially available for use in directly driving machine tools. What applicants have done and recognized not only to be possible but highly advantageous is to use the computerized system, not to directly provide the drive force to the machine tool, but rather as a precise control system to enable precise metering of hydraulic fluid to the hydraulic rams which actually move the carriages of the machine tool.

Thus, the control system of the preferred embodiment takes advantage of off-the-shelf computers with already developed software. A manual for computer 500 is submitted with the application, for general interest as illustrative of the types of the program instructions and operation of this system.

The computer 500 may be adapted to count the encoder signals so that the angular position of the shaft relative to a start point is known at any given time. The resolution of the encoder is normally matched with the number of threads per inch of the lead screw 120 to enable computation of the transverse absolute motion of carriage 20. Thus, for example, if a precision lead screw is used having four threads per inch to obtain a travel of one inch, the computer must sense $4 \times 2500$ or 10,000 signals indicative of a line passage from encoder 115. The preferred embodiment thus is capable of receiving carriage movement to within 1/10,000 of an inch. Since the movement of the carriage is directly determined by the angular displacement of the motor shaft, as a result of the servo action and its relation with lead screw 120, it may be seen that very acccurate movements of carriage 20 are possible by accurately controlling and monitoring the movement of motor shaft 101.

Figure 9:
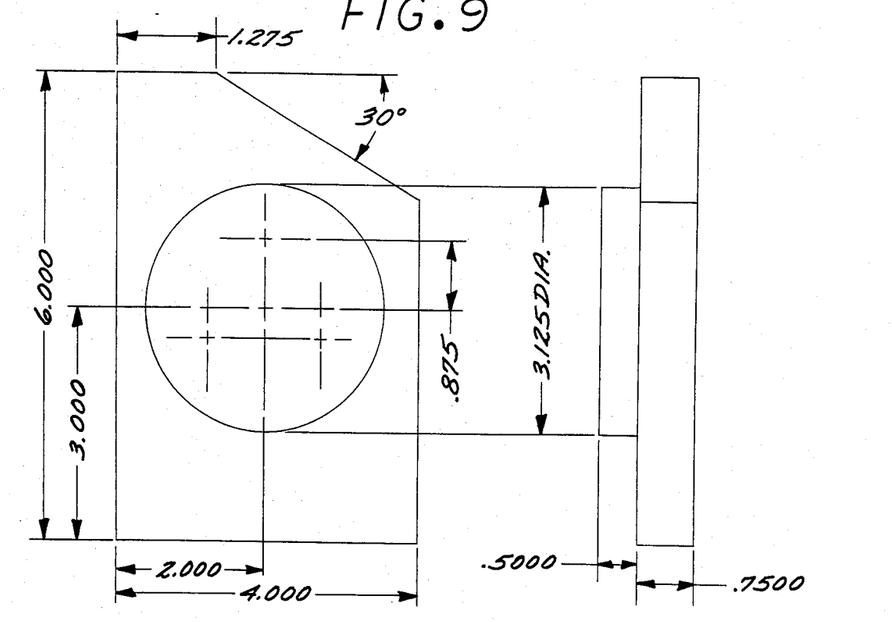
FIG. 9 shows front and side elevation views of an exemplary part machined by the preferred embodiment.

As an example of the operation of the system, the part illustrated in FIG. 9 may be machined by having the system execute the program set forth in Table 1:

TABLE 1

```
M03
F30
x2 y0
g41 x2 y2
f10 z-1
f5 x2 y6 z-2.25
m01 g201 x8 y6
m01 g201 x8 y4.75
m01 g201 x6.412 y2
m01 g201 f5 x1.5 y2 z-1.
f20
g40
f10 z-.5
f30 x4 y3
g801
f25 x8 y6
f10 z-.9
f5 z-1.5 m01 g201
x7 y6
f10 z-.5
f30 x2 y6
f5 z-1.5 m01 g201
f7 x2 y5
f20 x2 y3
f7 x2 y2
f20 x6.312 y2
f7 x6.512 y2
f5 z-2.25 m01 g201
f7 x7 y2
x8.5 y4
f10 z0
g40 x0 y0
m05
m06
```

The present invention comprises a tremendous advance in the hydraulic control art. The invented system couples the advantages of the electrical system, i.e. accurate positioning capability under computer control, with the simplicity and power of hydraulic mechanisms.

It is readily apparent that the invented control system is capable of machining to close tolerances in less time than a manual operator.

The electronic position feedback in the preferred embodiment is indicative of motor shaft displacement. It is possible for malfunctions to occur in the machine tool or the hydraulic system, e.g., in the servo valve. Two abnormal states are most likely. The first is a condition wherein the motor shaft is rotating, but there is no corresponding movement in the tool carriage. The second is the condition wherein the motor shaft is not turning, but the tool carriage is moving. Both situations become abnormal only after existing for some period of time, as there will normally be a time lag between the electric and hydraulic subsystem operations.

Figure 11:
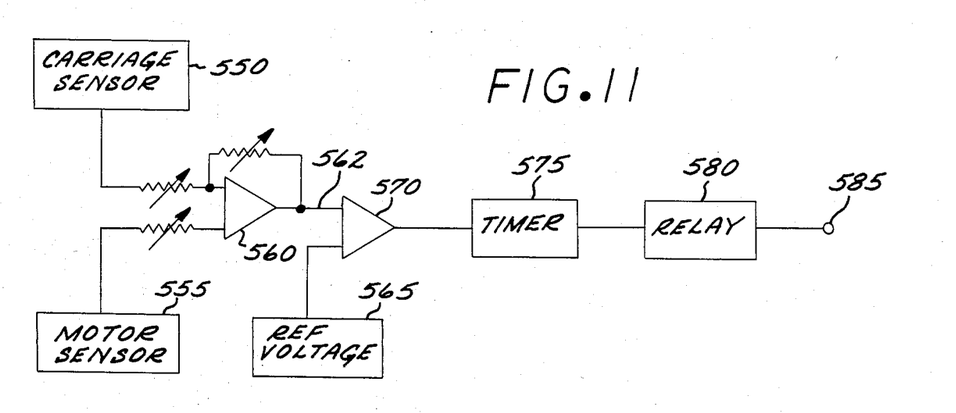
FIG. 11 is a schematic of the error detection circuit.

To minimize the possibility of damage to the machine tool workpiece as a result of these abnormal conditions, an error detect circuit is coupled into the system, as schematically shown in FIG. 11. This circuit operates as a motion comparator with timer, activating an error relay only when the abnormal condition exists for longer than a preset time delay period.

Movement sensor 550 is adapted to provide a voltage signal when the carriage 20 is in movement. Similarly, motor sensor 555 is adapted to provide a voltage signal when motor shaft 101 is rotating. The sensor 550 signal may be derived from the encoder 115 output. Sensor 550 is depicted in FIG. 1, and comprises a tachometer device, with a wheel 551 fitted to its shaft and contacting carriage 20. (Tachometers are well known in the art, and available from many sources, e.g., the Electro-Craft Corporation.) Thus, movement of carriage 20 along the Y axis imparts a rotary motion to wheel 551, thereby driving tachometer 550 to induce a voltage output. Various other means of sensing the motion of the tool carriage and motor shaft will readily appear to those skilled in the art.

The outputs of sensors 550 and 555 are coupled through resistors to operational amplifier 560 (e.g., type 1458) to produce differential voltage output 562. A reference voltage and output 562 comprise the input to comparator 570 (e.g., type 339). Once output 562 reaches the reference voltage level, the comparator 570 output starts the time delay sequence of the type 555 timer. The time delay is adjustable and may be preset to accommodate the typical response time of the hydraulic system. If output 562 equals or exceeds the reference voltage for a time greater than the preset time delay, the emergency stop relay is activated. The relay output may be coupled to computer 500, motor amplifier 80 and to the hydraulic pump of the tool 10, disabling tool operation. Similar error circuits are included for the Z and X axes mechanisms.

The circuit allows adjustment not only of the delay interval, but also the reference voltage level. Thus, for sensitive work, a very low reference level may be used, so that tool operation will be disabled even with small differences in signals from sensors 550 and 555.

Another advantage of the present invention is that the capability for manual tracer operation may be retained. This is advantageous, e.g., for low volume production runs, since the expense of generating a part program can be eliminated. Another advantage is that, in the event of control system malfunction, the tool may be used in the manual mode until repairs can be made. This capability results in greatly increased versatility for the machine tool.

The machine tool may be placed in the manual tracer mode in a conventional manner. Referring to FIGS. 4 and 6–8, the operator simply operates a lever when the servo valve is in the null position, supplying high pressure hydraulic fluid through line 150 to relieved area 149 and channel 188, thereby lifting piston 186 to raise nut 170 out of engagement with the threads of lead screw 120. Rotation of spool 145 will therefore not result in any linear travel, and the valve will remain in its null condition. The tracer operation typically uses its own set of valves and is therefore able to operate independently of the computer control. Prior art numerical control conversions are understood to involve the removal of all hydraulic components, including the tracer system.

While the control system of the present invention is ideally suited to conversion of manual machine tools such as described herein, the invention may be incorporated into new machine tools.

Various modifications in the control system described herein will be readily apparent to those skilled in the art. For example, instead of sensing the position of motor shaft 101, an encoding device could be mounted on screw 120, or on carriage 20. Stepping motors may be used instead of servo motors, in which case the position sensing devices could be dispensed. The invention does not require the use of a spool servo valve, but may readily be adapted to other types of manual hydraulic control mechanisms. Another adaptation of the present invention would be in the control of a hydraulic pump driving a lead screw to move the tool carriage, instead of a hydraulic ram. Thus, the present invention is defined by the following claims, given the widest scope consistent with the foregoing description.

What is claimed is:

1. In a machine tool wherein a tool implement is positioned by at least one hydraulic ram controlled by at least one hydraulic valve, an improved control system comprising:

rotary electric drive means;

a rotating member coupled to and driven by said rotary electric drive means, and coupled to each said hydraulic valve, comprising at least a spool member coupled to a fixed lead screw such that the axial position of said spool member along said screw is substantially directly related to the movement of said tool implement, and controls the flow of hydraulic fluid to said coupled hydraulic valve for driving said valve;

sensing means for directly sensing the action of said electric drive means and generating a signal indicative of said action; and central controller means coupled to said electric drive means and said sensing means for controlling the operation of said drive means in response to said sensing means indicator signal so as to cause said spool member to change position along said screw and control the flow of hydraulic fluid to said coupled hydraulic valve, thereby causing said hydraulic ram to controllably position said tool implement.

2. The improved control system of claim 1 wherein said sensing means comprises position encoder means.

3. The improved control system of claim 2 wherein said controller means is adapted to cause said electric drive means to rotate said rotating member to accomplish a predetermined movement of said tool implement.

4. The improved control system of claim 3 further comprising means for providing a warning signal when an abnormal condition exists.

5. The improved control system of claim 4 wherein said abnormal condition includes a first state wherein said motor is rotating and said tool implement is not moving in response to said motor rotation, and a second state wherein said motor is not rotating and said tool implement is in motion, each of said states occurring only after elapsement of a predetermined time delay.

6. The improved control system of claim 2 wherein said encoder means provides a signal indicative of the angular displacement of said electric drive means.

7. The control system of claim 1 wherein said hydraulic valve comprises servo valve means for operation with closed loop feedback in response to movement indicative of an axial movement of said tool implement.

8. The control system of claim 7 wherein said spool member has an axial movement substantially along a direction parallel to an axis of movement of said tool implement.

9. The control system of claim 8 further comprising position sensing means for providing signals indicative of an axial position of said tool implement.

10. The control system of claim 9 wherein said position sensing means includes means for providing signals indicative of angular movement of the shaft of said motor means.

11. In a machine tool wherein a tool implement slide is positioned by at least one hydraulic ram controlled by at least one hydraulic servo valve coupled to said slide such that rotation of a spool member is translated into an axial movement of said spool member, said servo valve further including means for employing closed loop feedback such that the axial movement of said spool is in the direction opposite to the direction of slide movement such that said servo operation is about a null position, an improved control system comprising:

electric motor means having a rotating shaft coupled to said spool member to rotate said spool;

position detecting means for directly detecting an angular displacement of said shaft and for providing signals indicative of the angular displacement of said shaft, said angular displacement being directly related to the movement of said slide;

central controller means for causing said motor shaft to turn through a predetermined angular displacement, said position detecting means signals being provided to said controller and employed to determine the angular displacement of said shaft, and thereby the axial displacement of said slide.

* * * * *